(12) United States Patent
Foltzer

(10) Patent No.: US 6,487,329 B2
(45) Date of Patent: Nov. 26, 2002

(54) NON-BLOCKING WAVELENGTH ROUTER ARCHITECTURE WITH WAVELENGTH REUSE CAPABILITY

(75) Inventor: Lawrence E. Foltzer, Occidental, CA (US)

(73) Assignee: Turin Networks, Petaluma, CA (US)

( * ) Notice: Subject to any disclaimer, the term of this patent is extended or adjusted under 35 U.S.C. 154(b) by 0 days.

(21) Appl. No.: 09/805,554

(22) Filed: Mar. 12, 2001

(65) Prior Publication Data

US 2002/0126943 A1 Sep. 12, 2002

(51) Int. Cl.$^7$ ............... G02B 6/26; H01S 3/13; G02F 1/35
(52) U.S. Cl. ............ 385/15; 385/20; 385/24; 372/32; 359/326
(58) Field of Search ............ 385/15, 16, 17, 385/18, 19, 20, 21, 22, 23, 24; 359/326–332; 372/32, 6, 28, 19

(56) References Cited

U.S. PATENT DOCUMENTS 5,265,112 A * 11/1993 Noll et al. ............ 385/24 X
6,008,931 A * 12/1999 von Helmolt et al. ...... 359/326

\* cited by examiner

*Primary Examiner*—Phan T. H. Palmer
(74) *Attorney, Agent, or Firm*—Blakely, Sokoloff, Taylor & Zafman LLP

(57) ABSTRACT

An apparatus comprising a comb generator and multiple modulators is described. In one embodiment, the comb generator generates a multi-wavelength comb of optical frequencies. Each of the modulators receives the comb on one input as well as an input data signal on another input. Each of the modulators modulates the comb with its input data signal, thereby creating a modulated comb signal having duplicate signal sidebands on each spectral line of the comb. Each modulator outputs the modulated comb signal on the output.

20 Claims, 7 Drawing Sheets

Typical Wavelength Rooter Implementation

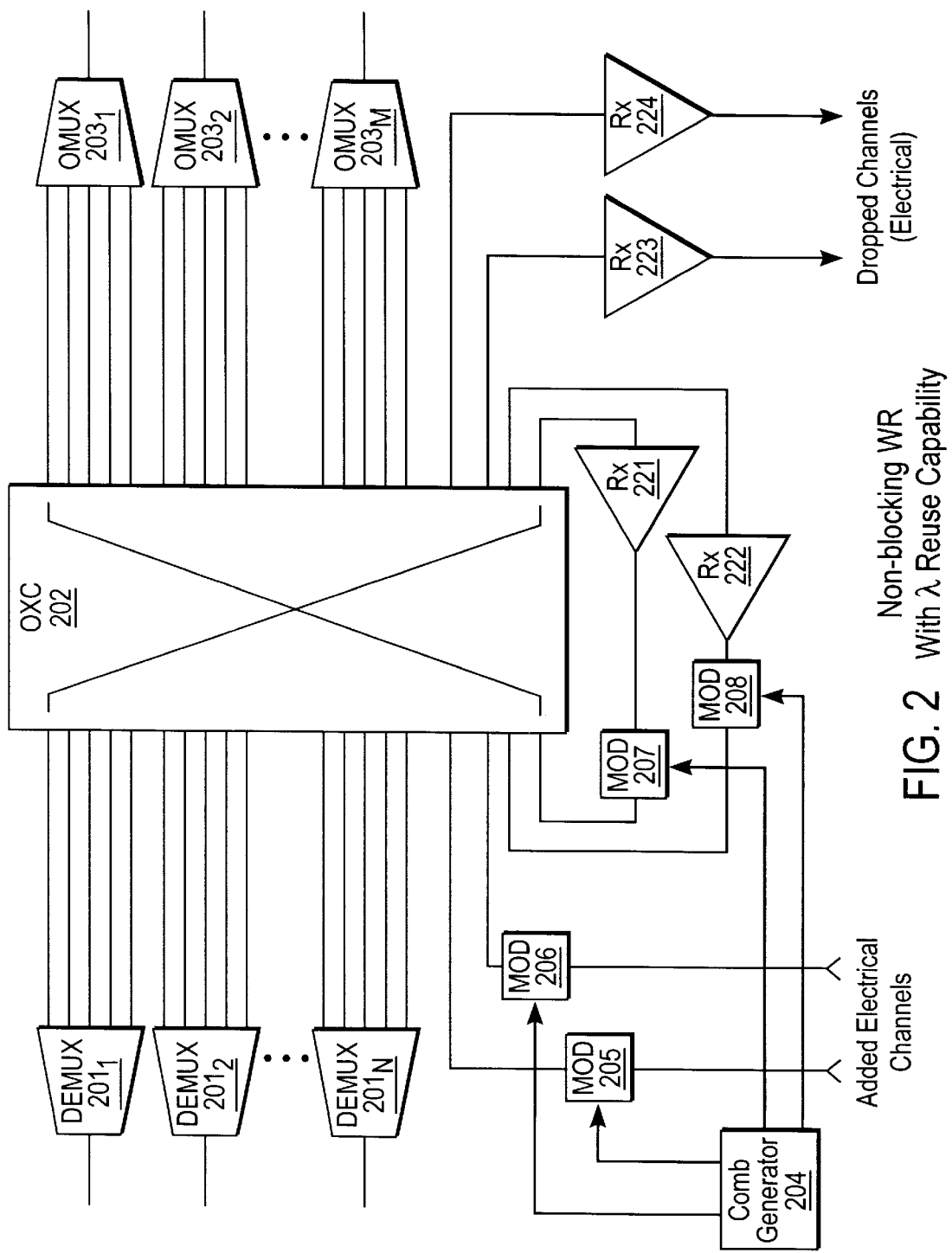
FIG. 2  Non-blocking WR With λ Reuse Capability

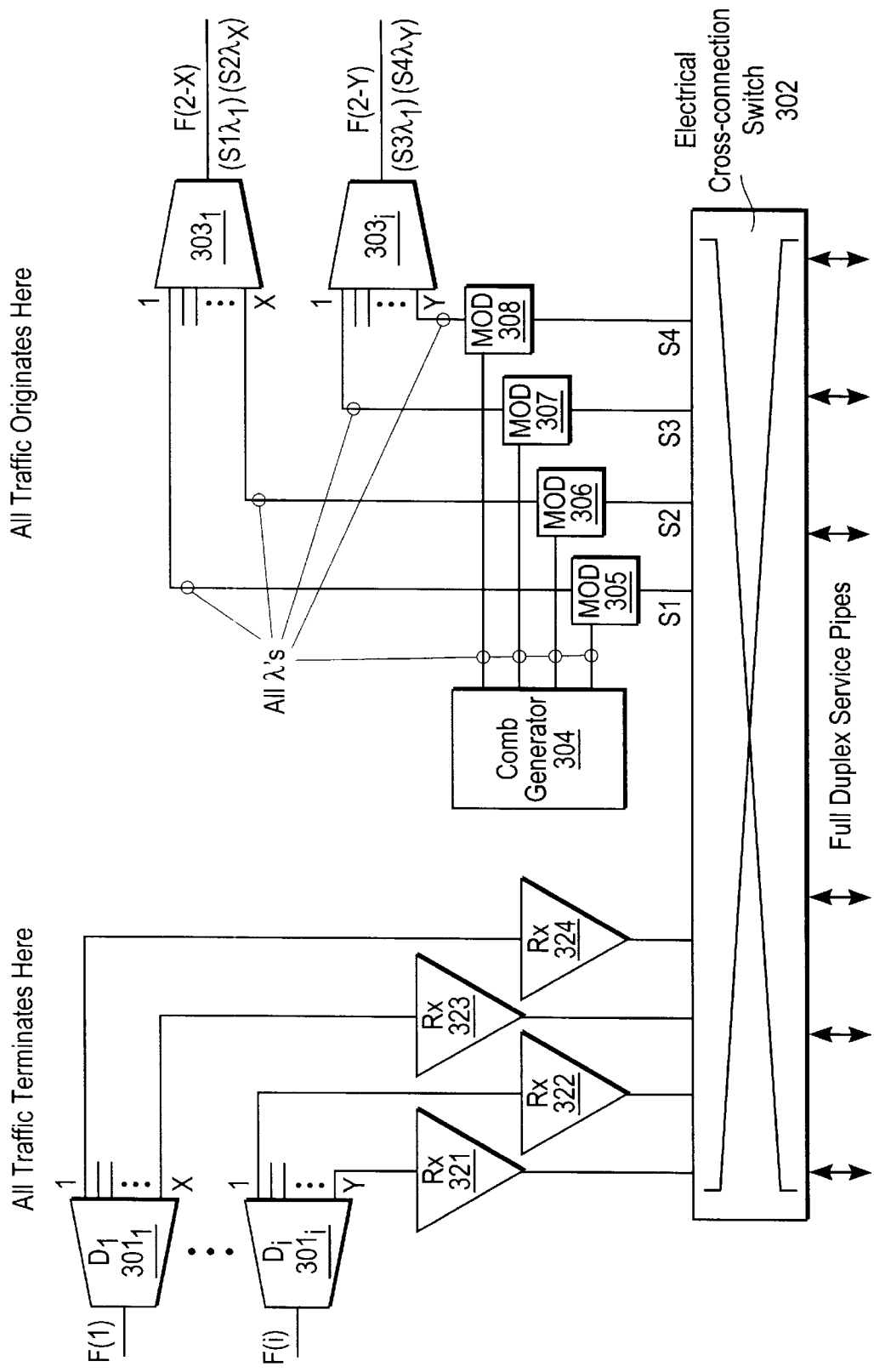
FIG. 3 Service Node Architecture

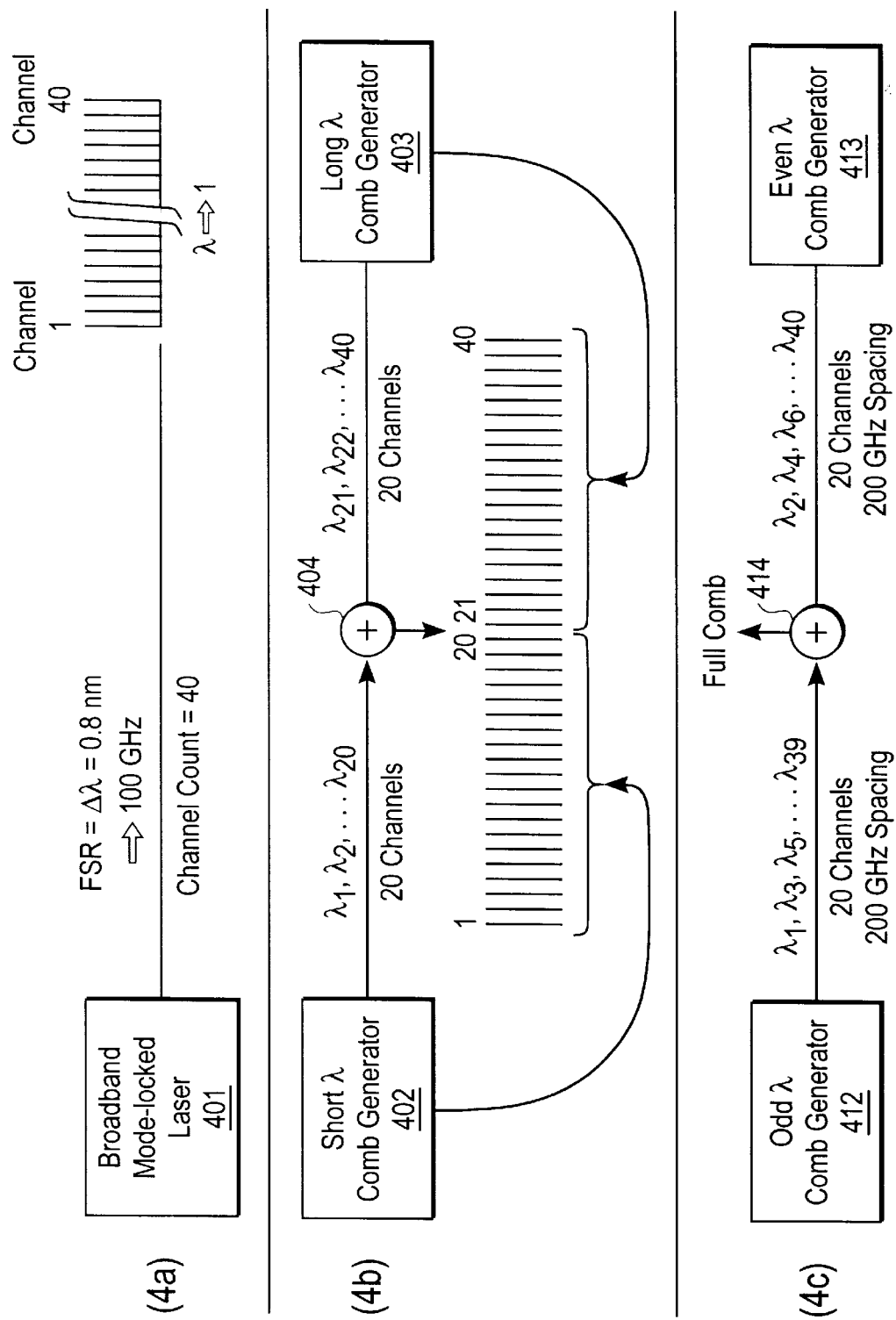
FIG. 4 Comb Generation Concepts

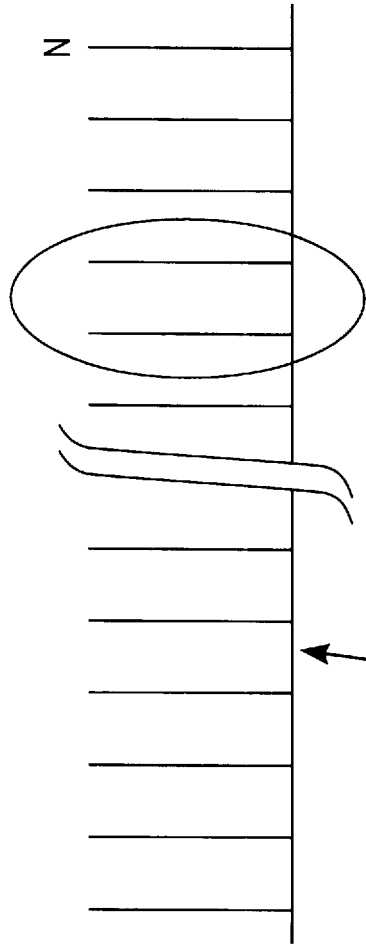
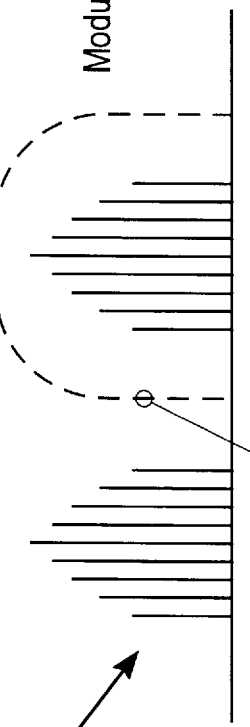
FIG. 4d — Full Unmodulated Optical Line
FIG. 4e — Exploded View of Two Unmodulated Spectral Lines
FIG. 4f — Modulated Spectral Line Pair
After Modulation All Lines Will Have Sidebands
Passband of a Single OMUX Input Port Optical Frequency Comb Generator 600

NON-BLOCKING WAVELENGTH ROUTER ARCHITECTURE WITH WAVELENGTH REUSE CAPABILITY

FIELD OF INVENTION

The invention is related to the field of dense wavelength division multiplexing (DWDM) for fiber optic communications systems; more particularly, this invention is related to non-blocking wavelength routers and reusing wavelengths.

BACKGROUND OF THE INVENTION

Wavelength routers are being used widely today in optical systems. The current methods used to implement wavelength router functionality can be classified into two different categories based on the technique they employ to perform the wavelength routing. One of the two technique relies on an Optical-to-Electrical-to-Optical (OEO) conversion process, where an input signal carried by a specific wavelength carrier on an input fiber, is demultiplexed, converted to an electrical signal by a photo detector and electronic circuitry, and then switched electronically to the input of a wavelength specific optical transmitter that is associated with potentially one of several wavelength specific fiber optic multiplexer ports driving a specific output fiber. One of the problems with this approach is that with current technology, one needs a plethora of lasers to perform the routing function. Each port of an optical multiplexer that serves an output fiber needs its own wavelength-matched laser, and each laser needs its own high power consumption, temperature stabilization circuit. Furthermore, in high reliability applications, the 1+1 protection optics double laser cost and power consumption. Providing spares is extremely costly for this approach since the likelihood of a failure is independent of the wavelength of the laser.

The other widely used technique, which is still the subject of much development, attempts to achieve both bit rate and signal format transparency by reducing the amount of electronics in the signal path. The ultimate vision then is called the "All Optical Network" or AON. In the AON, tunable lasers, tunable filters and optical switches replace their electronic counterparts. In a typical wavelength router implementation using these tunable lasers and filters and optical switches, the outputs of modulated tunable lasers drive the input side of an optical switch that interconnects the signal to the appropriate output fiber by way of a wavelength multiplexer. While this approach achieves bit rate and signal format independence, and addresses the issue of spares as well, it does little if anything to reduce cost and component count.

Also noteworthy is that in both of the approaches discussed above, an independent data stream modulates each laser or wavelength.

SUMMARY OF THE INVENTION

An apparatus comprising a comb generator and multiple modulators is described. In one embodiment, the comb generator generates a multi-wavelength comb of optical frequencies. Each of the modulators receives the comb on one input as well as an input data signal on another input. Each of the modulators modulates the comb with its input data signal, thereby creating a modulated comb signal having duplicate signal sidebands on each spectral line of the comb. Each modulator outputs the modulated comb signal on the output.

BRIEF DESCRIPTION OF THE DRAWINGS

The present invention is illustrated by way of example and not limitation in the figures of the accompanying drawings, in which like references indicate similar elements, and in which:

FIG. 2 is a block diagram of one embodiment of a non-blocking wavelength router with reuse capability.

FIG. 3 is a block diagram of one embodiment of a service node architecture.

FIGS. 4A–C illustrate multiple techniques for generating a comb.

FIG. 4D illustrates illustrates a portion of the full unmodulated comb.

FIG. 4E illustrates an exploded view of two unmodulated spectral lines and a modulated spectral line pair that are part of the full unmodulated comb shown in FIG. 4D.

FIG. 4F illustrates the modulated spectral line pair of FIG. 4E having sidebands.

DETAILED DESCRIPTION

Figure 1:
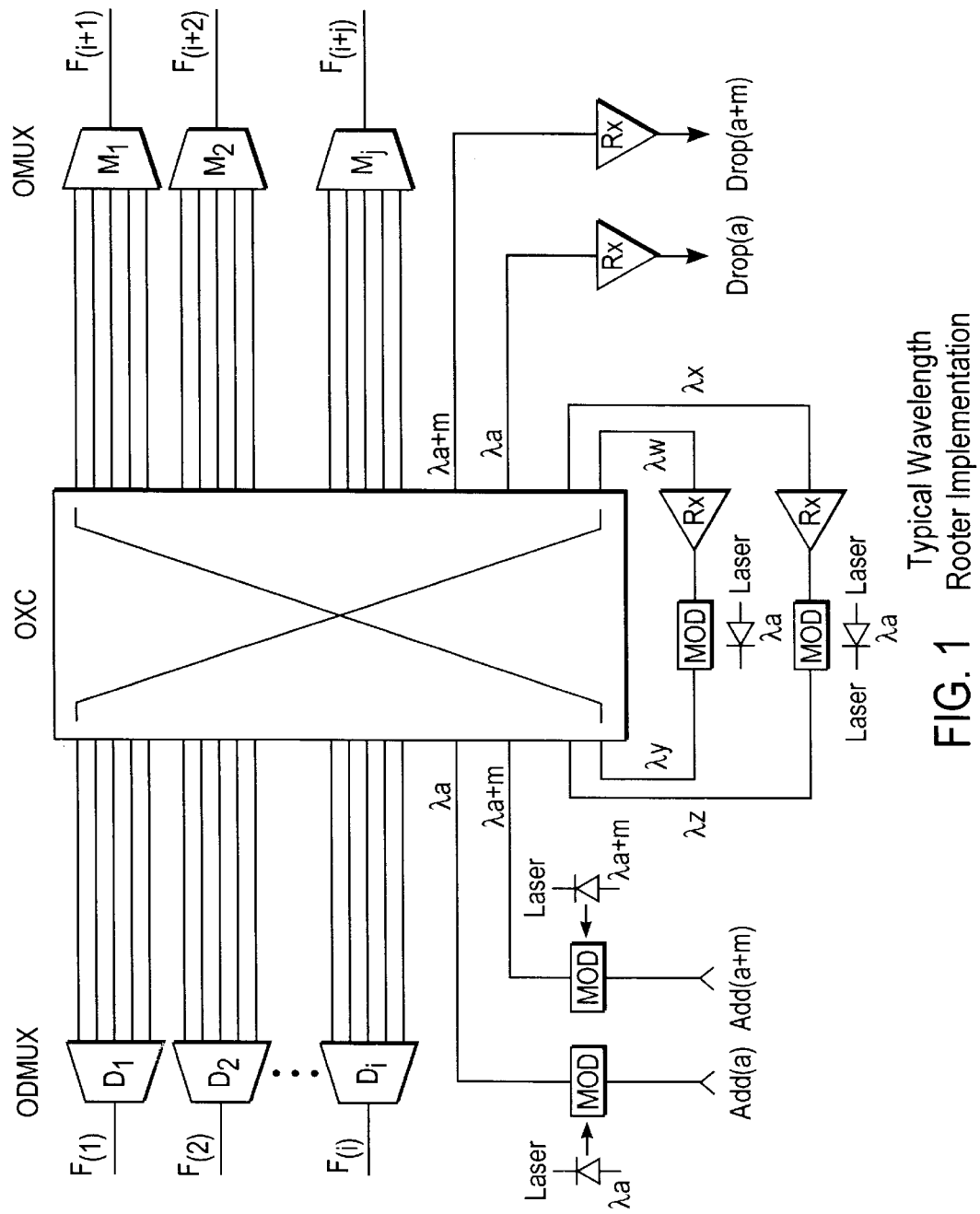
FIG. 1 is a block diagram of one embodiment of a wavelength router.

A wavelength router system architecture is described in which multiple input data streams each modulate all the carrier frequencies of a comb generator, in parallel, and in separate spatial domains and the pass band of the multiplexer port to which each modulated comb is directed determines the final carrier frequency.

Only a small number, possibly two multi-wavelength generating laser sources, are required to implement a fully redundant system. These multiple-wavelength or multiple-frequency optical sources are called optical comb generators (OCG). In one embodiment, the output of the OCG on a per carrier basis is low and requires amplification. The comb is amplified considerably before being split into multiple copies of the comb, via a power splitter, for example. Copies of the comb are distributed to individual intensity modulators, which impress their information in the side bands of each of the carriers that make up the comb's spectrum. Thus, each of the modulators acts as a transmitter. This composite signal is then switched or steered optically to any input port of an optical multiplexer, where all carrier frequencies but the one carrier frequency associated with that port, are rejected, while the selected wavelength is multiplexed into the DWDM stream on the output of the multiplexer. Thus, selection of the appropriate spectral frequency occurs near or at the multiplexer. This multiplexing mechanism is often referred to as a broadcast and select mechanism.

Thus, in one embodiment, the architecture described herein simultaneously modulates a group of optical frequencies called the comb, in parallel, with a set of independent modulators and modulating signals. Each modulator is provided with a copy of the comb to modulate with its unique data pattern and, as such, creates duplicate signal side-bands on each spectral line of the comb. This approach solves the problems of spectral reuse, and wavelength blocking in an optical switching center.

The technique described herein is expected to have a significant impact on the cost of DWDM systems as well, especially in large channel count system where the cost of the comb is further amortized. The cost saving comes primarily from the elimination of the current, per channel laser pair requirement, which is reduced to a single redundant pair of comb generators. Couple that savings with the same order of magnitude savings in system power dissipation, PCB real estate, and inventory control problems associated with stocking many different wavelength components, and it is clear that the present invention provides clear advantages over the prior art.

Noteworthy of the technique described herein is that the decision as to on which wavelength to transmit (i.e., the transmission wavelength decision) is postponed to the very last point in the signal path, i.e. at the output optical multiplexer. This technique makes use of the wavelength dependent and selective nature of certain optical WDM multiplexer devices, to reject, discard, attenuate all incident signals, with the exception of the channel that that port is designed to multiplex onto the common output port. Using this technique, all one has to do to shift a channel's operating wavelength is to redirect the modulated comb signal to the appropriate multiplexer input port using an optical switch.

In one embodiment, a modulated comb signal is used in a system that includes an electronic switching fabric or cross-connect, instead of an optical switch, ahead of the modulators, such as shown in FIG. 3 and described below. This configuration appears to have merit in a service node type application where wavelength assignment tends to be static. That said, the configuration might not need an electronic cross-connect at all, particularly in small systems where connections can be established manually.

In the following description, numerous details are set forth in order to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

FIG. 1 shows an example of the unidirectional path through a topology of a generalized optical wavelength router as implemented using existing current technology and methods common to the telecommunications industry. Referring to FIG. 1, optical signals are shown entering the wavelength router node (WR) from the left on fibers F(1)–F(i), each feeding an optical wavelength demultiplexer (ODMUX), $D_1$–$D_i$. Each of the input fibers may contain multiple data channels, each carried separately on a different wavelength or optical carrier frequency. The number of optical channels transported in each fiber may be different; however, they must conform to a network wide frequency plan or channel spacing to assure equipment compatibility. On the right side of the WR, there are "j" output fibers, F(i+j), fed from optical multiplexers (OMUX) $M_1$–$M_j$. As is the case for the input side of the WR, there is no requirement for the channel count of the multiplexers to be uniform.

An optical switch or cross-connect (OXC) 101 is coupled between ODMUXs $D_1$–$D_i$ and OMUXs $M_1$–$M_j$. The number of input and output ports using current technology may range from as low as 8 and extend to 4096. The input side of OXC 101 is fed from three potential interfaces. The first interface is the output of ODMUXs $D_1$–$D_i$. The second interface is the output of add-channel transmitters, Add(a) through Add(a+m), and the third interface is the output of wavelength converters (translators) and/or optical signal regenerators. In most current implementations, particularly where cost must be contained, the wavelengths of the transmitters associated with the $Add_1$–$Add_m$ ports and the translator ports are fixed, or restricted, to covering only a few of the system wavelengths.

The receive side of the WR of FIG. 1 is, for the most part, un-restrictive from a wavelength point of view. This is due to the fact that the technology used to build the photo-detectors used in the receivers are broadband devices that respond well to all of the wavelengths used in the 1550 nm optical window. The specific ODMUX port that is mapped to the receiver, through OXC 101, provides receiver channel selection. Note also that the optical frequency translators are wrapped around OXC 101. This arrangement allows translators to be fed from any channel or wavelength and provides them access to only those specific OMUX ports on the output-side of the WR that are tuned to the translators specific output wavelength.

As stated previously, in most current implementations, Add-ports and translator-ports are tuned to one wavelength only. This means that $Q=(n \times j)$ different translators will be required at a WR to provide full wavelength translation potential, where n equals the number of wavelengths the DWDM system is designed to support.

Recently, optical semiconductor researchers have announced the development of tunable optical transmitters and lasers. While this development goes a long way towards solving systems manufacturers inventory problems for fixed wavelength lasers, it does nothing to reduce overall laser count, power consumption, or reduce the complexity of the electronics needed to maintain the correct operating parameters in system applications. However, tunable lasers exact a high price for the benefits they offer, i.e., frequency agility and inventory problem reduction, costing about 10 times the price of the fixed wavelength counterparts. Needless to say, this is a very expensive proposition.

FIG. 2 shows one embodiment of a non-blocking wavelength router with λ reuse capability. Such a wavelength router may be used as part of an optical transmitter and receiver node for use in, for example, an optical ring network. The router uses an optical switch 202 to perform the necessary routing of signals, and in this case, the selection of the optical carrier frequency used for transmission as well.

Referring to FIG. 2, multiple DEMUXs $201_1$–$201_N$ have inputs coupled to input signals and outputs coupled to inputs of optical switch 202 in a manner well-known in the art. Outputs of OXC 202 are coupled to inputs of OMUXs $203_1$–$203_M$. Note that M and N may be the same or may be different.

Optical comb generator 204 is coupled to provide a comb to a pair of intensity modulators 205 and 206 (e.g., EO modulators). The comb is multiple carrier signals, each at a different wavelength. In one embodiment, the comb passes through a tunable preselection filter before being input to modulators 205 and 206. Each of modulators 205 and 206 has an input coupled to an added (electric) channel and intensity modulate the entire comb of optical frequencies with data from their independent input bit pattern (data signal) received on the added channel. The outputs of modulators 205 and 206 are coupled to inputs of OXC 202. Although only two modulators are shown to add channels, any number of such modulators may be added with each receiving a comb from comb generator 204.

Similarly, a pair of outputs of OXC 202 is routed to local, optical receivers 221 and 222. In one embodiment, these receivers employ broadband, wavelength independent detectors that respond to all carrier frequencies within the band of interest. The outputs of receivers 221 and 222 are coupled to inputs of intensity modulators 207 and 208, respectively, which also have an input coupled to receive a comb from comb generator 204. Again, the comb may pass through a tunable preselection filter prior to being input to modulators 207 and 208. Although only two receivers and modulators are shown, any number of such receiver/modulator pairs may be added with each receiving a copy of the comb from comb generator 204. The modulated carrier signals of the comb output from modulators 207 and 208 are fed back into OXC 202.

OXC 202 routes the modulated signals to one of multiple output channels that is tuned to a given wavelength. The modulated signal having the given wavelength is received by the output channel and transmitted. A fiber amplifier, such as an Erbium-doped fiber amplifier (EDFA), may be used to amplify signals before transmission onto, for example, a ring network.

A pair of outputs of OXC 202 is also coupled to inputs of local optical receivers (e.g., photodiodes) 223 and 224, which are similar to or the same as receivers 221 and 222. The outputs of receivers 223 and 224 represent dropped or terminated (electrical) channels. Although only two receivers are shown, any number of such receivers may be added to drop or terminate channels.

Although not shown in FIG. 2, the output of OXC 202, or alternatively as part of each output part of OXC 202, are input to pass band filters that each receive multi-wavelength modulated comb and allows one frequency of the modulated signal to pass through the corresponding output below. In one embodiment, the filter is part of the OMUX itself. In one embodiment, a coupler and/or attenuator may be coupled in series with the output of each pass band filter before being input to an OMUX.

One key difference between the wavelength router of FIG. 2 and that of the prior art is as follows:

Modulators 205–208, acting as transmitters, share a common multiplexed source of all the optical carrier frequencies, i.e. the comb from comb generator 204. The carrier frequencies that make up the spectrum of the comb might be generated totally as a group, or may be synthesized by interleaving alternate odd and even channel frequencies that are generated separately, or the merging of bands of contiguous carrier frequencies, e.g., red and blue. Some alternative methods of comb generation are depicted in FIGS. 4A–C.

In one embodiment, in a system showing one or more line interface units, the line interface unit transmitters only contain modulators, which are required to create a modulated signal with low chirp, suitable for high-speed, long-distance applications.

Figure 5:
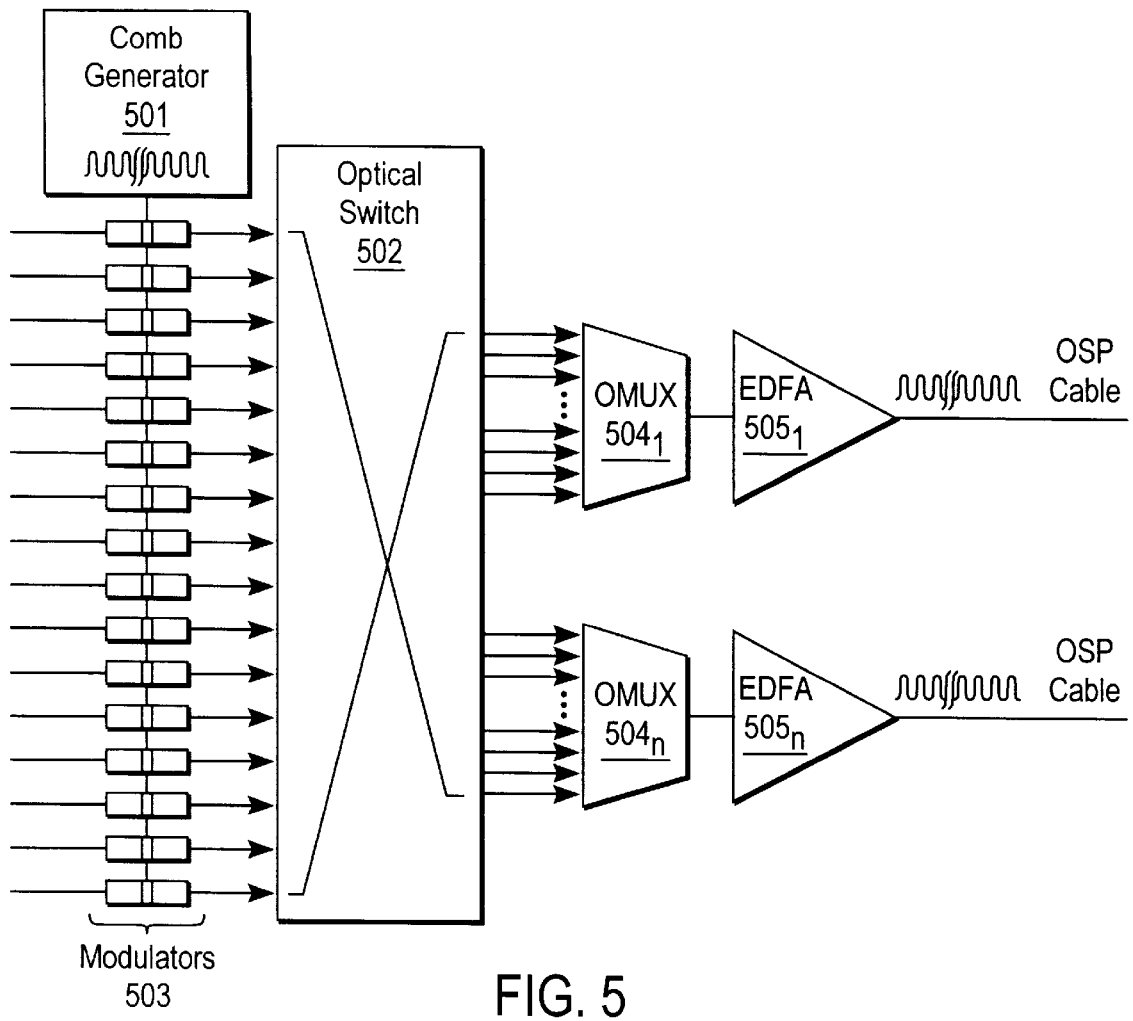
FIG. 5 is a block diagram of an alternative embodiment of a non-blocking wavelength router.

Each data channel modulator 205–208 simultaneously modulates all or part of the optical carrier frequencies that make up the comb. The actual carrier frequency that will be used for transmission will be determined via an optical carrier frequency selection process. The optical carrier frequency selection is performed in the spatial domain by steering the modulated comb of partial comb to a wavelength specific port on the OMUX. A filter associated with the port rejects or discards all of the modulated carriers, with the exception of the channel frequency to which it is tuned. The signal of that channel is then combined with the signals passed by the other OMUX ports $203_1$–$203_M$ to form the composite DWD output signal. Signal flow through the transmitter portion of the system is shown in FIG. 5.

FIG. 3 shows an application of the technique described herein, which is referred to herein as a service-node case. A service node may reside in a central office and serve as the feed node for other nodes subtended on one or more DWDM rings. The service node, in this case, would be the originator and terminator for all, or most, of the traffic on the ring. In this role, no traffic passes through the service node, and wavelength re-assignment isn't required here. However, the idea of sharing a common carrier source is compelling in and of itself.

Referring to FIG. 3, multiple DEMUXs $301_1$–$301_i$ have inputs coupled to input signals and outputs coupled to receivers 321–324. The outputs of receivers 321–324 are coupled to inputs of electrical cross-connect switch 302 in a manner well-known in the art. Although only four receivers are shown, any number may be used depending on the system and/or the number of input ports available. Electrical cross-connect switch 302 is also coupled to full duplex service pipes.

Outputs of electrical cross-connect switch 302 are coupled to inputs of modulators 305–308, which also are coupled to receive a comb from comb generator 304. The outputs of modulators 305–308 are coupled to inputs of OMUXs $303_1$–$303_M$. Although only four modulators are shown, any number of such modulators may be added with each receiving a comb from comb generator 304. Note that M and i may be the same or may be different.

As in FIG. 2, each modulator 305–308 impresses its individual signal on the entire carrier set. In one embodiment, the path of the modulating signal through one of modulators 305–308 and to an OMUX is hard-wired (fixed). Mapping of a particular signal in this case is performed in the electrical domain through an electrical cross-connect fabric. The DWDM multiplexers then perform the task of channel transmission wavelength selection and channel multiplexing.

FIGS. 4A–C illustrate a number of techniques that may be used to generate the complete spectrum of the comb. Note that the techniques are described with reference to comb generators generating 40 channels. However, the number of channels being generated may be dependent on the application or system configuration.

FIG. 4A illustrates a broadband mode-locked laser 401 generating 40 channels with a 100 GHz spacing (an FSR representing the delta between wavelengths of 0.8 nanometers.

FIG. 4B illustrates a short λ comb generator 402 to generate $\lambda_1, \lambda_2, \ldots \lambda_{20}$ and a long λ comb generator 403 to generate $\lambda_{21}, \lambda_{22}, \ldots \lambda_{40}$. The outputs of short λ comb generator 402 and long λ comb generator 403 are merged together with combiner 404 in a manner well-known in the art to create an output of all 40 channels.

FIG. 4C illustrates an odd λ comb generator 412 to generate $\lambda_1, \lambda_3, \ldots \lambda_{39}$ and an even λ comb generator 413 to generate $\lambda_2, \lambda_4, \ldots \lambda_{40}$. In one embodiment, each of odd λ comb generator 412 and even λ comb generator 413 generates 20 channels with a 200 GHz spacing. The outputs of odd λ comb generator 412 and even λ comb generator 413 are interleaved together with interleaver 414 in a manner well-known in the art to create a full comb having all 40 channels.

FIG. 4D illustrates a portion of the full unmodulated comb. FIG. 4E illustrates an exploded view of two unmodulated spectral lines and a modulated spectral line pair that are part of the full unmodulated comb shown in FIG. 4D. FIG. 4F illustrates the modulated spectral line pair of FIG. 4E having sidebands, which are included in the passband of a single OMUX input port.

FIG. 5 expands on the concept illustrated in FIG. 2, focusing on a high add-port channel count scenario. Referring to FIG. 5, electrical signals entering from the left are input to drive modulators 503, which are coupled to receive a comb from comb generator 501. Drive modulators 503 act as a high-speed switch, gating modulators 503 on and off in accordance with the value of a data bit, thereby modulating all of the optical carriers and directing them appropriately through optical switch 502.

Thereafter, the outputs of optical switch 502 are coupled to inputs of OMUXs $504_1$–$504_N$, where only one spectral line (e.g., OSP cable) is multiplexed onto the outgoing fiber, via a fiber amplifier (e.g., erbium-doped fiber amplifier (EDFA) along with other signal on other carriers.

An Exemplary Comb Generator

Figure 6:
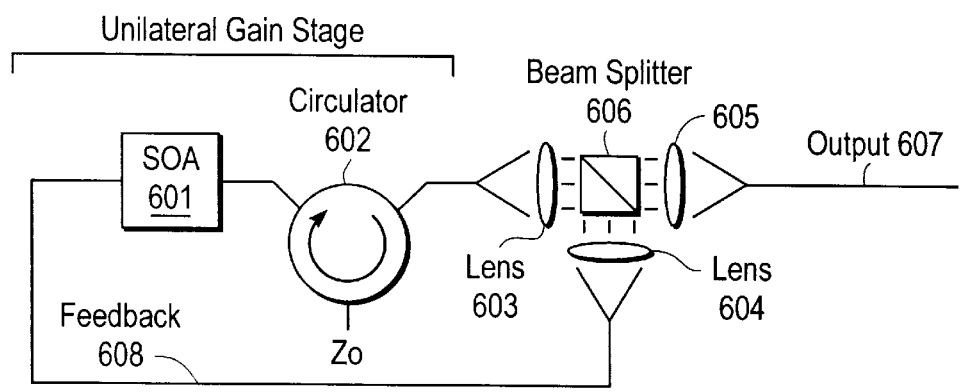
FIG. 6 is a block diagram of one embodiment of an optical frequency comb generator.

FIG. 6 is one embodiment of an optical frequency comb generator. Referring to FIG. 6, optical comb frequency generator 600 is an optical oscillator that generates many optical frequency carrier signals simultaneously. Like its electronic counterpart, optical comb frequency generator 600 includes a unilateral gain stage, an output-coupling device and a frequency determining network. The unilateral gain stage samples and amplifies the comb output of lens 604. In one embodiment, the unilateral gain stage comprises a circulator 602 coupled to Semiconductor Optical Amplifier (SOA) 601. In one embodiment, the output-coupling device comprises a beam splitter 606, input lens 603 and output lens 605, while the frequency-determining network applies the appropriate phase shift in the frequency to satisfy the phase requirements. In one embodiment, the frequency-determining network controls the change in frequency and includes the round trip delay through all of the components of the system. Circulator 602 is used to force the oscillator to run in a clockwise direction (clockwise circular transmissive cavity loop mode), which maximizes gain and output power.

Multi-frequency operation requires that the gain around the loop is greater than the losses around the loop over the desired range of frequencies. The second, and necessary, condition for oscillation is that the loop's phase shift is zero at the frequencies of operation, to create a regenerative situation. However, because the wavelength of an optical signal is short, relative to the loop (cavity) length, literally hundreds or thousands of wavelengths may fit within the cavity length for any specific frequency.

To make the arithmetic easy to follow, assume a cavity length of 1.0 mm, and that our reference wavelength is 1.0 um, such that there are 1000 wavelengths, fitting exactly, in the cavity. The frequency of this carrier then is, c/1.0 um, or roughly 300 THz. As frequency is increased, there is a point where exactly 1001 wavelength fit end to end in the cavity, and that wavelength is 1.0 mm/1001, and the corresponding frequency is 300.3 THz. Both of these wavelengths meet the second necessary condition for oscillation, as do other frequencies whose wavelengths are in integer sub-multiple of the cavity length. It is this phenomenon that gives rise to the generation of the equally spaced carriers of the comb generator.

The difficult part of making a comb generator that complies with the ITU wavelength grid is that the carrier frequencies are widely spaced to accommodate high channel bit rates. To generate widely-spaced carriers calls for a short cavity length, that can only be achieved in a fully integrated reflective, bi-directional structure, rather than the unidirectional design shown in FIG. 6.

The comb generator may include a multi-wavelength resonant oscillator device, such as, for example, a Fabry-Perot device. The Fabry-Perot device may comprise a Fabry-Perot etalon in between two collimating lenses, with a wavelength band envelope filter positioned near or coupled to the face of the collimating lens facing the etalon. The envelope filter associated with the collimating lens on the output side of the Fabry-Perot device allows light beams within a given range of wavelengths to pass through the collimating lens and onto an output filter.

The simplest way that a comb generator might be made is to build a wideband Fabry-Perot Laser (FPL). FPLs, as implemented today, are poor quality comb generators, in that they have been tailored to reduce the number of spectral lines generated, which reduces chromatic dispersion in a fiber link. It is desirable to have as many wavelengths in a specific part of the spectrum as possible, preferably of equal intensity, and reproducible in intensity, spectral flatness, and wavelength accuracy.

An optical power splitter may be used to divide a comb to create copies of the comb to feed multiple modulators.

An Exemplary Modulator

Figure 7:
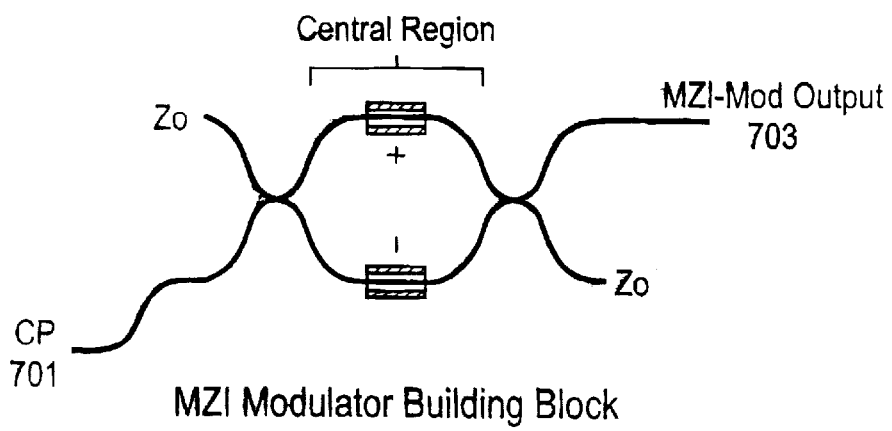
FIG. 7 is a block diagram of one embodiment of a Mach-Zehnder Interferometric modulator building block.

There are a number of types of modulators that may be used. For example, a Mach-Zhender interferometric modulator may be used. FIG. 7 is one embodiment of a well-known transmissive Mach-Zhender interferometric Electro-Optic (EO) modulator. Referring to FIG. 7, the MZI modulator building block is shown having a Carrier Input Port (CIP) 701 and a modulator output port 703. In the central region, electrodes are placed over portions of the waveguide material, such that an electric field may be applied to the regions. In FIG. 7, the signs indicate that the two regions are driven with a differential signal. This differential signal alters the refractive index of the underlying material linearity, shifting the relative phase of the two signals. When the phase change is of sufficient magnitude, either constructive or destructive interference occurs in the output combiner, effectively turning the transmitted power on or off at the port of interest.

There are several problems with the MZI modulator of FIG. 7. One problem is its overall length from the input side to the output side is long and takes a lot of expensive material to make the device. Another problem with the is establishing a high-speed electronic interface to the part, i.e., the signals either have to come to the device from both sides, or the near side signal has to be delayed slightly to compensate for the longer path to the far side electrode. Yet another problem is the capacitance of the electrode, which tends to limit high speed performance.

However, as transmission system speeds continue to increase, existing component designs also have insufficient bandwidth to meet those needs. In one embodiment, an alternative embodiment of a MZI modulator is used that has a different topology that doubles the bandwidth through the reduction in parasitic capacitance, while simplifying the physical realization of the high speed electrical interface. This topology also reduces element capacitance by a factor of two along with the amount of EO material required to build the device, thereby increasing yield and halving the die cost. Furthermore, one embodiment of this MZI modulator uses reduced electrical drive power and has a simplified electrical signal interface for packaging. Also, this MZI modulator simplifies the integration potential of high-speed components.

Figure 8:
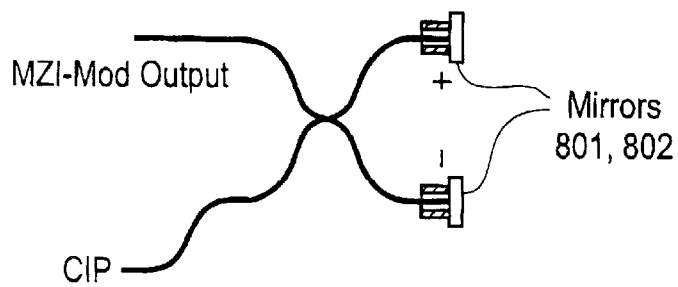
FIG. 8 is a diagram of one embodiment of a novel MZI building block.

FIG. 8 illustrates one embodiment of a reflective EO MZI modulator. The symmetry of the MZI modulator of FIG. 7 is utilized and allows its structure to be truncated or cut in half. Referring to FIG. 8, mirrors 801 and 802 are applied to the ends of the waveguides. In so doing, the amount of material needed for the structure is halved, thereby doubling the number of devices that can be yielded from a wafer. The length of the electrode region has also been halved, but because the signal interacts with the index change in both directions the magnitude of the EO effect remains the same. By having reduced the electrode length, the capacitance of the structure is also halved, giving a clear advantage in electrical speed. Furthermore, the structure partitions or separates the electrical and optical interfaces, and for the former, greatly simplifies access to the electrodes, and facilitating the formation of a high-speed interface.

Figure 9:
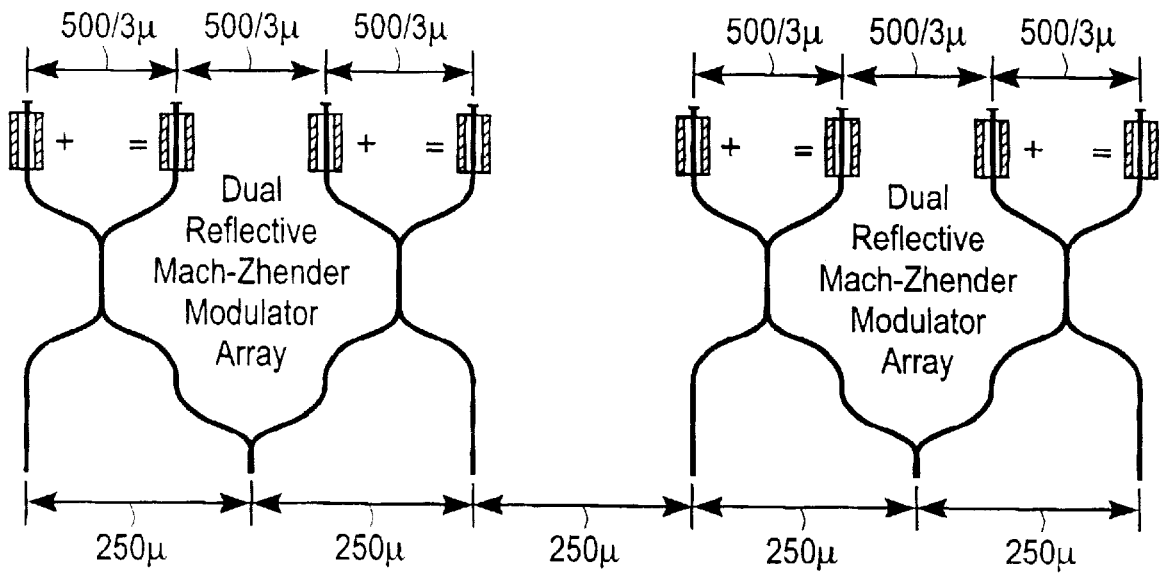
FIG. 9 is a block diagram of a duel reflective Mach-Zhender modulator array.

FIG. 9 illustrates how a pair of modulators may be fed from a single carrier port for applications requiring higher density. Quads or higher density implementations can be built by simply stepping and repeating the pattern.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
   a comb generator to generate a multi-wavelength comb of optical frequencies; and
   a plurality of modulators coupled to receive the comb, each of the plurality of modulators having an input to receive an input data signal and an output, each of the plurality of modulators to modulate the comb with its input data signal creating a modulated comb signal having duplicate signal sidebands on each spectral line of the comb and to output the modulated comb signal on the output.

2. The apparatus defined in claim 1 further comprising:
   an optical switching mechanism to receive modulated comb signals from the plurality of modulators and to steer the modulated comb signal to an output port, wherein ports of the optical switching mechanism having a filter tuned to only permit passage of signals at a predetermined channel frequency; and
   an optical multiplexor having a plurality of inputs coupled to individual output ports of the switching mechanism to combine signals on the plurality of inputs into a composite output signal.

3. The apparatus defined in claim 1 further comprising:
   an electrical cross-connect having outputs coupled inputs of the plurality of modulators; and
   a plurality of optical multiplexors having a plurality of inputs, with at least one of the plurality of inputs coupled to receive a modulated comb signal from at least one of the plurality of modulators to transmit one spectral line of each modulated comb signal received thereby onto an output optical fiber.

4. The apparatus defined in claim 3 wherein each of the plurality of optical multiplexors performs channel transmission wavelength selection and channel multiplexing to select the one spectral line of each modulated comb signal and to combine the one spectral line with signals on the plurality of inputs, thereby creating a composite output signal.

5. The apparatus defined in claim 1 further comprising:
   an optical switch to receive modulated comb signals from the plurality of modulators and to switch the modulated comb signal to an output channel; and
   a plurality of optical multiplexors coupled to the switch to transmit one spectral line of each modulated comb signal onto an output optical fiber,
   wherein modulators of the plurality of modulators are gated on or off depending on values of data bits received as the input data signal.

6. The apparatus defined in claim 1 wherein the comb generator comprises a broadband mode-locked laser.

7. The apparatus defined in claim 1 wherein the comb generator comprises:
   a first wavelength generator to generate a first continuous band of carrier frequencies;
   a second wavelength generator to generate a second continuous band of carrier frequencies; and
   a combiner coupled to merge the first and second continuous bands of carrier frequencies into the comb.

8. The apparatus defined in claim 1 wherein the comb generator comprises:
   an odd wavelength generator to generate a plurality of odd channel frequencies;
   an even wavelength generator to generate a plurality of even channel frequencies; and
   an interleaver coupled to the odd and even wavelength generators to merges the interleave channel frequencies of the plurality of odd channel frequencies and the plurality of channel frequencies into the comb.

9. The apparatus defined claim 1 wherein the comb generator comprises a Fabry-Perot laser.

10. The apparatus defined in claim 1 wherein the comb generator comprises:
    an unilateral gain stage;
    an output-coupling device coupled to the unilateral gain stage; and
    a frequency determining network.

11. The apparatus defined in claim 10 wherein the unilateral gain stage comprises:
    a circulator; and
    a Semiconductor Optical Amplifier (SOA) coupled to the circulator.

12. The apparatus defined in claim 10 wherein the output-coupling device comprises:
    an input lens;
    a beam splitter optically coupled to receive light from the input lens; and
    an output lens optically coupled to focus light output from the beam splitter to an output fiber.

13. The apparatus defined in claim 1 wherein at least one of the plurality of modulators comprises a Mach-Zehnder Interferometric (MZI) modulator.

14. The apparatus defined in claim 13 wherein the MZI modulator comprises:
    a carrier input port (CIP);
    a modulator output port;
    a pair of waveguides coupled along a portion of each, a first end of a first waveguide of the pair of waveguides being coupled to the CIP and a first end of a second waveguide of the pair of waveguides being coupled to the modulator output port; and pair of mirrors coupled to second ends of the first and second waveguides in proximity to locations on the first and second waveguides over which electrodes are positioned to apply an electric field to regions of the first and second waveguides.

15. A method comprising:

generating a multi-wavelength comb of optical frequencies;

simultaneously modulating the comb with a plurality of modulators with a set of modulating signals received as input data signals by the plurality of modulators to create a modulated comb signal having duplicate signal sidebands on each spectral line of the comb; and outputting the modulated comb signal on an output of each of the plurality of modulators.

16. The method defined in claim 15 further comprising:

steering the modulated comb signal from the plurality of modulators to output ports of a switch;

filtering the modulated comb signals at each output port of the switch to only permit passage through said each output port of signals at a predetermined channel frequency; and multiplexing filtered modulated comb signals to create a composite signal at each of a plurality of optical multiplexors by combining signals received from the switch on a plurality of inputs of said each of the plurality of optical multiplexors.

17. The method defined in claim 15 further comprising:

each of a plurality of optical multiplexors performing channel transmission wavelength selection and channel multiplexing to select the one spectral line of each modulated comb signal and to combine the one spectral line with signals on a plurality of inputs of said each of the plurality of optical multiplexors, thereby creating a composite output signal.

18. An apparatus comprising:

means for generating a multi-wavelength comb of optical frequencies;

means for simultaneously modulating the comb with a plurality of modulators with a set of modulating signals received as input data signals by the plurality of modulators to create a modulated comb signal having duplicate signal sidebands on each spectral line of the comb; and means for outputting the modulated comb signal on an output of each of the plurality of modulators.

19. The apparatus defined in claim 18 further comprising:

means for steering the modulated comb signal from the plurality of modulators to output ports of a switch;

means for filtering the modulated comb signals at each output port of the switch to only permit passage through said each output port of signals at a predetermined channel frequency; and means for multiplexing filtered modulated comb signals to create a composite signal at each of a plurality of optical multiplexors by combining signals received from the switch on a plurality of inputs of said each of the plurality of optical multiplexors.

20. The apparatus defined in claim 18 further comprising:

each of a plurality of optical multiplexors to perform channel transmission wavelength selection and channel multiplexing by selecting the one spectral line of each modulated comb signal and combining the one spectral line with signals on a plurality of inputs of said each of the plurality of optical multiplexors, thereby creating a composite output signal.

* * * * *

UNITED STATES PATENT AND TRADEMARK OFFICE
CERTIFICATE OF CORRECTION

PATENT NO. : 6,487,329 B2
DATED : November 26, 2002
INVENTOR(S) : Foltzer

It is certified that error appears in the above-identified patent and that said Letters Patent is hereby corrected as shown below:

Column 8,
Line 41, delete "linearity" and insert -- linearily --.

Column 10,
Line 15, delete "signal" and insert -- signals --.

Column 11,
Line 4, delete "pair" and insert -- a pair --.

Signed and Sealed this

Eighth Day of April, 2003

JAMES E. ROGAN
*Director of the United States Patent and Trademark Office*